Aug. 29, 1950 W. EWALD ET AL 2,520,535
CONTROL SYSTEM FOR AIR CONDITIONING APPARATUS
Filed June 19, 1948
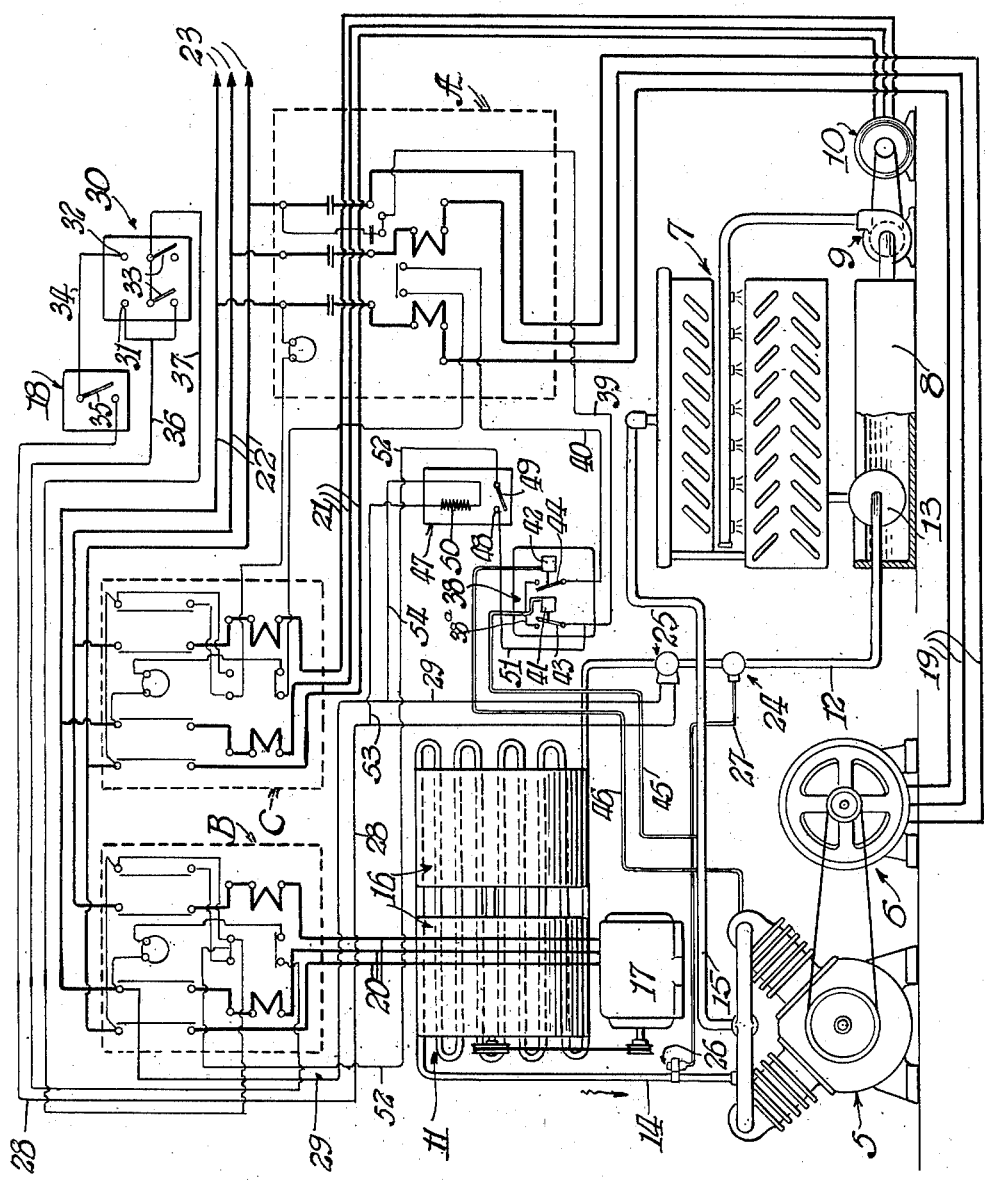
Inventors
Warren Ewald
Charles E. Miller Patented Aug. 29, 1950

2,520,535

UNITED STATES PATENT OFFICE 2,520,535

CONTROL SYSTEM FOR AIR-CONDITIONING APPARATUS

Warren Ewald and Charles E. Miller, Minneapolis, Minn., assignors to United States Air Conditioning Corporation, Minneapolis, Minn., a corporation of Delaware Application June 19, 1948, Serial No. 34,004

2 Claims. (Cl. 62—4)

This invention relates to improvements in air conditioning apparatus and it consists of the matters hereinafter described are more particularly pointed out in the appended claims. The present invention is more especially concerned with apparatus of this kind having as a part thereof motor driven refrigerating systems of the compression type and including an evaporator through which air is passed to cool the same, by means of a motor driven blower.

The primary control for the apparatus is usually afforded by an electric thermostat located in the space into which conditioned air is delivered. Said thermostat controls the circuit for an electrically actuated valve in the liquid line of the refrigerating system and this valve in combination with a thermostatic expansion valve governs the flow of refrigerant to the evaporator (usually in the form of a coil) of the system.

When refrigerant is admitted to the evaporator, an increase in pressure occurs in the suction line therefor, which through a pressure actuated switch causes the starters for the compressor motor and the condenser motor to start them into operation and they run until the suction line pressure is lower than that at which the said switch is actuated. Said motors will then stop when the compressor and condenser "pump away" and condense the refrigerant faster than it is converted into gas in the evaporator. When the thermostat cuts off the supply of refrigerant to the evaporator, the compressor motor will continue in operation until it reduces the suction pressure to the setting of the pressure actuated switch.

This is called the "pump down" of the system and the compressor motor should remain inactive until more cooling is required in the space to be cooled. However, when the valve structure in the compressor becomes worn, suction pressure leaks back therethrough and an objectionable restarting of the apparatus and known as "short cycling" occurs, which is hard on the apparatus and increases current consumption.

One of the objects of the present invention is to provide simple, inexpensive means in apparatus of this kind, which prevents the short cycling action before mentioned, when space cooling is not required.

Another object of the invention is to provide in apparatus of this kind, a simple, effective relay actuated switch in the circuit for the pressure actuated switch, which relay actuated switch is controlled by the thermostat, so that said relay actuated switch has veto power over and controls the pressure actuated switch, whereby short cycling operations are eliminated.

The above mentioned objects of the invention, as well as others, together with the advantages thereof will more fully appear as the specification proceeds.

In the drawing, the lone figure thereof is a diagrammatic view illustrating the preferred form of the invention.

Referring now in detail to that embodiment of the invention illustrated in the drawing, there is embodied therein a refrigerant compressor 5 and its driving motor 6, a condenser 7 employing water as a part of the coolant therefor and which is circulated from a tank 8 by a pump 9, driven by a motor 10. The evaporator is indicated at 11 and it is herein illustrated as a serpentine coil. Its inlet end is connected by a conduit 12 to the liquid receiver 13 preferably located in the water in the tank 8. The outlet side of the evaporator is connected by a conduit 14 with the suction side of the compressor 5 and the pressure side of the compressor is connected by a conduit 15 leading to the condenser 7. Air is blown through the evaporator by means of a blower 16 driven by a motor 17. After the air has passed through the evaporator, wherein heat units are extracted therefrom, it is delivered with a sensible temperature and latent heat drop in the space room to be cooled (not shown) and in which is located a temperature responsive device 18, such as a conventional thermostat.

The motors 6, 10 and 17 are herein shown as of the three-phase type and each has associated therewith a motor starter shown only diagrammatically in the drawing. Such starters are well known commercial products and each consists of a magnet that is energized by a light current from the controls. This magnet pulls into contact a heavy switch which carries current to the associated motor to be started. Each starter also includes a thermal overload protection device so that contact for the heavy switch will be broken if too much current passes to the associated motor. The starter indicated at A is associated with the compressor motor 6 and is connected thereto by the conductors 19. The starter indicated at B is associated with the motor 17 for the blower 16 and is connected to said motor by the conductors 20. The starter indicated at C is associated with the motor 10, which also drives a blower (not shown) employed for blowing air through the condenser and this starter is connected to said motor by the conductors 21. The several starters A, B and C are connected by conductors 22 to a source of operating current by means of a suitable fused disconnect switch indicated by the arrow heads 23. The parts thus far described are conventional in apparatus of this kind and no claim is made herein thereto.

In the conduit 12 is located a thermostatic expansion valve 24 and an electric solenoid controlled valve 25. The valve 24 is actuated in response to the superheat of the evaporated refrigerant as it enters the suction side of the compressor by means of the conduit 14. To this conduit is attached a bulb 26 of temperature responsive fluid and this cylinder is connected by small diameter tubing 27 with the valve 24.

One side of the solenoid valve 25 is connected by a conductor 28 with one side of the space or room thermostat 18 and the other side of said valve is connected by a line 29 with one of the terminals of the motor starter B so as to receive energizing current therefrom when a lower temperature is called for in the space in which the thermostat 18 is located. This constitutes the main circuit for the apparatus so far as temperature control is concerned and when said circuit is open the apparatus remains passive or inoperative.

Conditions might arise wherein it is desired that the motor 17 be energized to drive the blower to produce ventilation in the space in which the thermostat 18 is located. For this reason there is associated with said thermostat a toggle type of manually operable switch 30, that includes sets of contacts 31—32 and a double throw switch or control arms 33—33. One of the contacts 32 is connected by a line 34 with the movable contact 35 of the thermostat. The set of contacts 31 is connected by a line 36 with a terminal in the motor starter B to receive current therefrom. The arms 33 of switch 30 are connected by a line 37 with another terminal in the motor starter, to receive current therefrom.

When the apparatus is under the control of the thermostat 18, the switch arms 33 are thrown to engage the upper contacts 31—32. When it is desired to cut out the thermostat and to control the operation of the motor 17 to drive the blower 16 for ventilation purposes only, the switch arms are thrown into engagement with the lower contacts 31—32. This completes the circuit through the starter B to control the operation of the motor 17 and associated blower 16.

Also included in the apparatus is a pressure operable means 38 in the form of a switch that includes terminals which are connected by lines 39 and 40 with coacting terminals in the motor starter A. The means 38 also includes bellows 41 and 42 that operate movable contacts 43 and 44 and these bellows are connected by tubing 45 and 46 with the pressure side and the suction side respectively of the compressor 5. The lines 39—40 are connected to the movable contacts 43 and 44 and said contacts 43 and 44 move into and out of engagement with fixed contacts at the ends of a bridge 38a. When the movable contacts are engaged with the contacts at the ends of the bridge 38a, that part of the circuit including the line 39—40 is closed through the switch 38.

47 indicates a relay device which includes a contact 48 and a switch arm 49 movable under the action of a relay coil 50. The contact 48 is connected by a line 51 with the terminal 38a of the switch 38, while the movable contact 49 is connected by a conductor 52 with a terminal in the starter B. The coil 50 is connected by lines 53—54 with the lines 28 and 29 leading to the solenoid valve 25.

The conductors 19, 20 and 21 constitute the power circuit for the motors 6, 17 and 10 while the conductors 28 and 29 constitute one part of the control circuit of the apparatus and the conductors 51, 52, 53 and 54 form a second part of the control circuit and which includes the conductors 39 and 40 respectively. The thermostat 18 through the conductors 28 and 29 controls the valve 25 in the liquid refrigerant conduit 12 and this valve along with the valve 24 governs the flow of refrigerant to the evaporator.

When the thermostat 18 causes a flow of refrigerant to the evaporator, an increase in pressure occurs in the suction side of the compressor and such pressure causes the pressure actuated switch 38 to close the second part of the control circuit and energizes the starter A and C for the compressor motor 6 and condenser motor 10 and starts them into operation. When so started, these motors will continue to run until the suction pressure reduces to one that is lower than the setting for the pressure switch 38. The said motors will stop if the compressor and the condenser pump away and condenses the refrigerant faster than the evaporator 11 converts the liquid refrigerant into gas.

When the thermostat operates through the valve 25 to cut off the supply of refrigerant to the evaporator, the compressor will continue in operation until it reduces the suction pressure to the setting of the pressure switch 38 and this continuance of the compressor to run is called a "pump down." After this "pump down" has occurred, the compressor motor 6 stops and remains in this position until more cooling is required in the space, in which the thermostat 18 is located. However, if the suction pressure arises, due to a leak back of gas through the compressor or from refrigerant evaporation from the coil to the switch 38, a restarting of the apparatus with its attendant annoyance and waste of current energy would occur if it were not for the relay switch 47 and which restarting is known as "short cycling."

It is apparent that the relay switch 47 through the conductors 53—54 and 28—29 is under the control of and actuated by the thermostat 18 and this switch is closed only when the thermostat calls for cooling. Therefore, through this relay, the thermostat has veto power over the pressure switch 38 and said switch cannot function to permit the "short cycling" action because of increased suction pressure, when the thermostat 18 is satisfied with the temperature conditions in the space in which it is located.

By means of the relay 47, which is a simple and relatively inexpensive device that requires no manual attention or operation, short cycling of the apparatus is prevented, with the attending inconvenience, annoyance and waste of current energy.

While in describing the invention we have referred in detail to the form and arrangement of the parts involved, the same is to be considered only in the illustrative sense and therefore we do not wish to be limited thereto except as may be specifically set forth in the appended claims.

We claim as our invention:

1. A short cycling prevention circuit for refrigeration apparatus of the kind described, which embodies therein a motor driven refrigerant compressor, an operating circuit for said motor, a thermostatically controlled switch having open and closed positions and responsive to the temperature of the medium to be cooled, a pressure actuated switch having open and closed positions and operatively responsive to a relatively high pressure of refrigerant in the suction side of said apparatus to establish its closed position, said thermostatically controlled switch and said pressure actuated switch each forming a part of the control for the operating circuit for said motor, and a third switch in said circuit having open and closed positions and forming another part of the control for said circuit, through said pressure operated switch, said third switch being open and closed with said thermostatically controlled switch and when open preventing the closing of said circuit through said pressure operated switch and the short cycling operation of said motor in the closing of said pressure operated switch due to said relative high pressure of refrigerant in said suction side of the apparatus, and produced by a leaking back of the same to said last mentioned switch when said thermostatically controlled switch is in its open position.

2. A short cycling prevention circuit for refrigeration apparatus of the kind described, which embodies therein a motor driven refrigerant compressor, an operating circuit for said motor, a thermostatically controlled switch having open and closed positions and responsive to the temperature of the medium to be cooled, a pressure actuated switch having open and closed positions and operatively responsive to a relative high pressure of refrigerant in the suction side of said apparatus to establish its closed position, said thermostatically controlled switch and said pressure actuated switch each forming a part of the control for the operating circuit for said motor, and a third switch in said circuit and having open and closed positions and forming another part of the control for said circuit and including a relay energized to close said circuit through said pressure actuated switch when said third switch and said thermostatically controlled switch are in their closed positions, said third switch automatically opening when said thermostatically controlled switch is open and operating to prevent the closing of said circuit, through said pressure operated switch and the short cycling operation of said motor in the closing of said pressure operated switch due to said relative high pressure of refrigerant in said suction side of the apparatus, and produced by a leaking back of the same to said pressure operated switch when said thermostatically controlled switch is in its open position.

WARREN EWALD.
CHARLES E. MILLER.

REFERENCES CITED

The following references are of record in the file of this patent:

UNITED STATES PATENTS

| Number | Name | Date |
|---|---|---|
| 2,242,728 | Newton | May 20, 1941 |